United States Patent [19]

Steiger

[11] Patent Number: 4,691,832

[45] Date of Patent: Sep. 8, 1987

[54] STEP-LIKE FLOWER-BOX SUPPORT STRUCTURE

[76] Inventor: Horea Steiger, Untermaettli, 8913 Ottenbach/Zurich, Switzerland

[21] Appl. No.: 926,535

[22] Filed: Nov. 4, 1986

[51] Int. Cl.[4] ............................................. A47F 7/00
[52] U.S. Cl. ..................................... 211/71; 211/181; 211/182; 211/186
[58] Field of Search ...................... 211/85, 71, 74, 189, 211/181, 182, 186, 106, 195; 47/39, 41 R, 41.1, 41.2

[56] References Cited

U.S. PATENT DOCUMENTS

| | | | |
|---|---|---|---|
| 1,095,045 | 4/1914 | Timberlake | 211/181 X |
| 1,146,488 | 7/1915 | Finkelstein | 211/181 X |
| 1,659,791 | 2/1928 | Thorpe | 47/41 |
| 1,809,018 | 6/1931 | Bruning | 211/106 X |
| 1,907,917 | 5/1933 | White | 47/41 |
| 3,170,418 | 2/1965 | Gruenstein | 211/186 X |

Primary Examiner—Robert W. Gibson, Jr.
Attorney, Agent, or Firm—Paul M. Craig

[57] ABSTRACT

The step-like support structure for flower-boxes which consists only of two tubular members interconnectd by a bow-shaped member and of a third tubular member connected to the center area of the bow-shaped member. The support member, made of relatively strong spring wire, are thereby detachably assembled to the two tubular members provided with appropriate folds therefor. The entire support structure can be shipped disassembled in shipping containers of relatively small volume.

18 Claims, 6 Drawing Figures

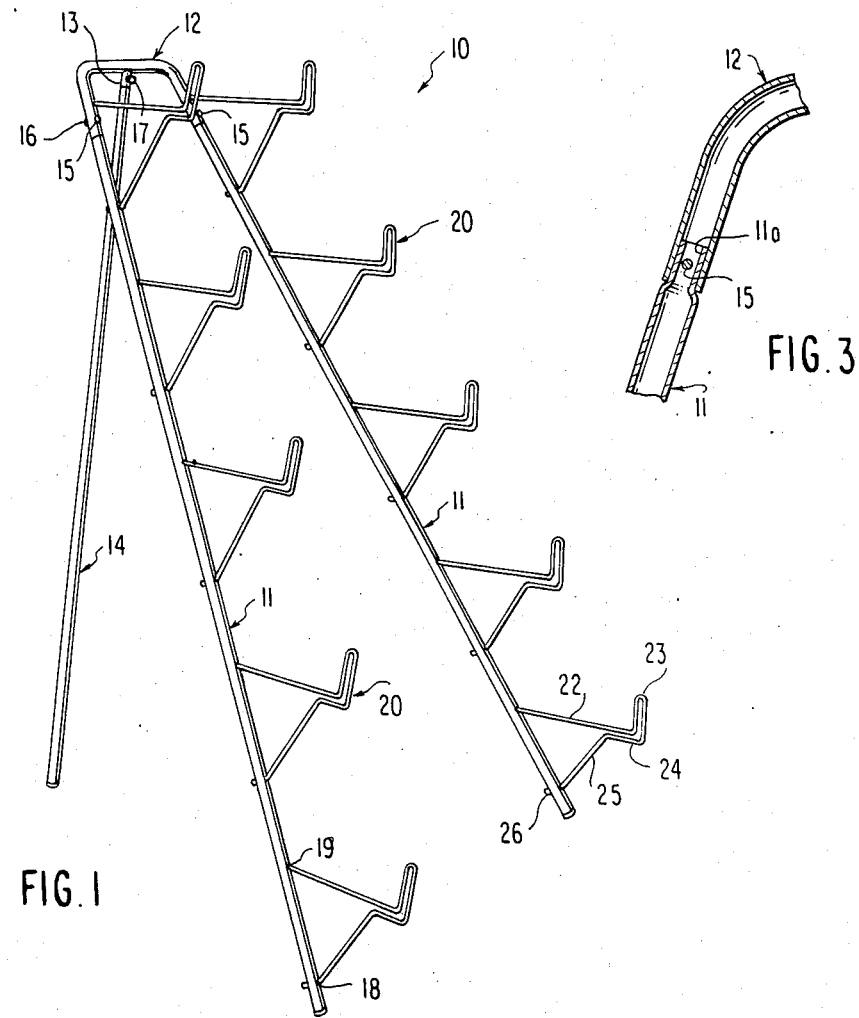
FIG. 1
FIG. 3
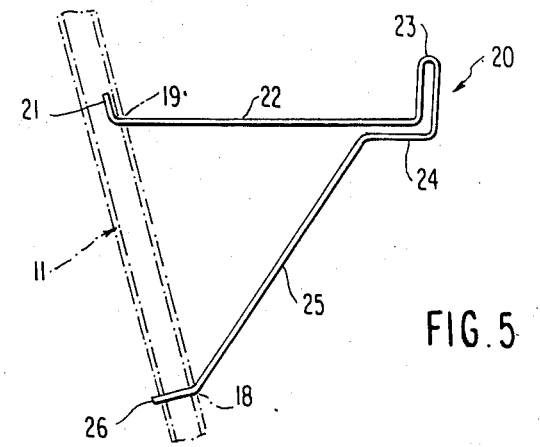
FIG. 5

STEP-LIKE FLOWER-BOX SUPPORT STRUCTURE

The present invention relates to a step-like flower-box support structure which can be readily assembled by the customer and is capable of supporting a relatively large weight of the filled flower-boxes.

Step-like flower-box support structures are known in the prior art, and as described, for example, in my German Gebrauchsmuster No. G 82 02 312.3. In this prior art support structure for flower-boxes, the frame consisted of a U-shaped integral main frame member and of a smaller integral U-shaped member pivotally connected approximately in the center of the legs of the U-shaped mainframe member in such a manner as to be capable of being pivoted out and thereby support the U-shaped mainframe member on the ground.

The flower-box support members were then assembled onto the legs of the U-shaped mainframe member in holes provided therein. While this particular structure enjoyed an immense commercial success, it entailed certain disadvantages. On the one hand, the integral U-shaped members required a relatively large amount of space for purposes of shipping, thus involving relatively large costs for shipping containers. Additionally, the prior art support structure did not lend itself readily to mass production techniques. In particular, it was difficult to provide the necessary holes in the legs of the U-shaped mainframe member by mass production techniques available today.

Accordingly, it is the principal object of the present invention to provide an improved step-like flower-box support structure which lends itself to high-speed mass production techniques, can be shipped in an economic manner, and can be readily assembled by the customer.

The underlying problems are solved by the present invention in that the support structure consists essentially only of two tubular members telescopically assembled to a bow-shaped connecting member and of a third auxiliary tubular member adapted to be readily assembled to the center of the bow-shaped member. By utilizing two separate straight tubular members of identical length, it is easy to provide the necessary holes both for the installation of the support members and the threaded connection with the bow-shaped member by conventional mass production techniques. The exact location and proper alignment of the holes poses no problem when straight tubular members of predetermined length are used. Additionally, the connection of the tubular members with each other by way of the bow-shaped connecting member can be realized in a rapid and safe manner by providing the upper end portions of the two tubular members with reduced diametric dimensions so as to be able to telescope into the ends of the bow-shaped member. The reduction in diameter at the upper ends of the two tubular members can also take place by conventional mass production techniques. Furthermore, the assembly can be realized in an extraordinarily sturdy and safe manner by the use of a bolt and nut extending through the nested ends of a tubular member and the corresponding end of the bow-shaped member, when properly aligned.

Though the suppport structure and assembly thereof is extremely simple, I have found to my great surprise that the support structure in accordance with the present invention, which is of pyramid-like configuration, is capable of supporting a relatively great weight, in excess of that of the prior art structure as disclosed in the aforementioned Gebrauchsmuster, utilizing tubular parts of the same strength and size. For example, the support structure in accordance with the present invention is capable of supporting thereon weights in excess of 100 kg.

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view of a step-like support structure for flower-boxes in accordance with the present invention;

FIG. 3 is a cross-sectional view, on an enlarged scale, illustrating the telescoping connection of the parts within the area of the dash-and-dot circle 3 of FIG. 2;

FIG. 5 is a somewhat schematic showing illustrating the shape of the support members for the flower-boxes and their installation in the tubular members.

Figure 2:
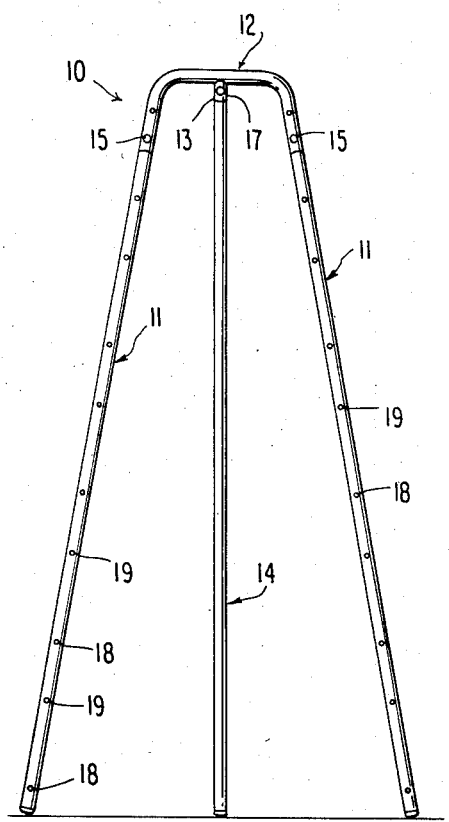
FIG. 2 is a front elevational view of the support structure of FIG. 1.
Figure 4:
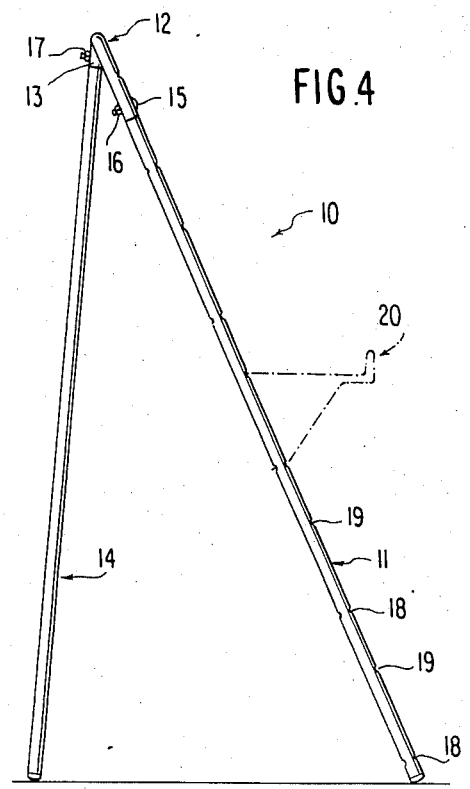
FIG. 4 is a side elevational view of the support structure of FIG. 2.

Referring now to the drawing wherein like reference numerals are used throughout the various views to designate like parts, and more particularly to FIG. 1, reference numeral 10 generally designates in this figure a step-like support structure for flower-boxes (not shown) which includes two tubular members generally designated by reference numeral 11 interconnected at their upper ends by a bow-shaped member generally designated by reference numeral 12 and a third tubular member generally designated by reference numeral 14 which is secured to the center area of the bow-shaped member 12. For that purpose, the bow-shaped member 12 is provided with a short tubular section 13 of slightly larger diameter than the tubular member 14 for guidingly receiving therein the tubular member 14. The two tubular members 11 are provided at their upper ends with reduced diametric short sections 11a adapted to telescope into the free ends of the bow-shaped member 12 for purposes of assembly. Bolts or screws 15 cooperating with nuts 16 are thereby utilized for securely connecting the telescoping parts 11a and 12 with the bolts 15 extending through diametral holes provided in both the nested parts which are aligned when properly assembled. A similar bolt-and-nut arrangement only schematically indicated by a dash-and-dotted line and designated by reference numeral 17 is used to fasten together the short tubular section 13 and tubular member 14. As can be seen in particular in FIG. 2, the tubular members are provided alternately with holes 18 and 19 whereby the holes 18 are provided diametrally opposite in the tubular members, while the holes 19 are provided only in the forward part of the tubular members 11 facing the support members generally designated by reference numeral 20 (FIGS. 4 and 5) carrying thereon the flower-boxes.

Each support member 20 thereby includes an upwardly bent hook-like end portion 21 (FIG. 5) for insertion into the interior of a tubular member by way of a hole 19. The hook-like end portion 21 is adjoined by a substantially horizontal portion 22 on which the flower-boxes rest. The horizontal portion 22 is adjoined by a narrow U-shaped portion 23 forming the outer stops for the flower-boxes. A short section 24 parallel to the portion 22 adjoins the U-shaped portion 23 and is followed by a downwardly inclined portion 25 terminating in an end portion 26 adapted to extend through diametrally aligned holes 18 in the tubular member 11. For purposes of assembling the support members 20, it is only necessary to insert the hook-shaped end portion 21 into the hole 19 in such a manner that it will extend upwardly substantially parallelly to the tubular member and thereafter to insert the end portion 26 through the diametrally aligned holes 18. The bent-up hook portion 21 of the uppermost step-like support member is thereby received in a hole 19 provided in the bow-shaped member at appropriate location near the free end thereof.

In lieu of the support members 20, also support members as shown in the aforementioned Gebrauchsmuster, can be used with the present invention, even though the support members as disclosed herein constitute a preferred embodiment.

The free ends of the tubular members 11 and 14 may be provided with appropriate rubber plugs or the like to further safeguard the support structure against unintentional movement and/or injury.

Figure 6:
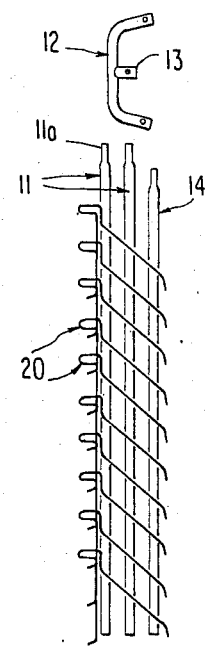
FIG. 6 is an elevational view illustrating the compactness of the disassembled support structure of the present invention for purposes of shipping.

FIG. 6 illustrates how the support structure of the present invention can be shipped in a very space-saving manner which is desirable from a cost point of view, especially as regards packaging and ease of handling.

It can be seen from the foregoing that the support structure of the present invention consists only of relatively few parts which require a slight volume for shipping. Additionally, the frame of the support structure consists only of three tubular members and a bow-shaped connecting member with welded-on short tubular section which can be manufactured in a simple manner by presently available automation techniques. Moreover, the frame support structure 11, 12, 13, 14 of the present invention is capable of supporting thereon a relatively large weight notwithstanding its simplicity.

While I have shown and described only one embodiment in accordance with the present invention, it is understood that the same is not limited thereto but is susceptible of numerous changes and modifications as known to those having ordinary skill in the art, and I therefore do not wish to be limited to the details shown and described herein, but intend to cover all such changes and modifications as are encompassed by the scope of the appended claims.

I claim:

1. A step-like flower-box support structure consisting of relatively few parts which can be easily shipped and assembled at the customer to support thereon a relatively great weight of flower boxes, comprising two tubular members, a substantially bow-shaped member for connecting the two tubular members into a generally U-shaped assembly, a third tubular member, first means for connecting said third tubular member with said substantially bow-shaped member to form a tripod support structure of generally pyramid-like configuration, a plurality of flower-box support members, and second means for detachably connecting said support members to said two tubular members in such a manner as to form the step-like flower-box support structure whose support members extend forwardly of the support structure.

2. A support structure according to claim 1, wherein said third tubular member is connected to said bow-shaped member in the center area of the latter so that, as viewed from in front of the two tubular members, the third tubular member is located substantially centrally of the two tubular members.

3. A support structure according to claim 2, wherein said generally U-shaped assembly is arranged in a plane extending rearwardly upwardly while the third tubular member extends rearwardly downwardly from its connection with the bow-shaped member.

4. A support structure according to claim 3, wherein the ends of the bow-shaped member and the upper ends of the two tubular members are of mutually complementary shape to enable a telescoping assembly.

5. A support structure according to claim 4, wherein the free ends of either the upper ends of the two tubular members or of the bow-shaped member are of reduced diametric dimension to permit the telescoping assembly.

6. A support structure according to claim 5, further comprising threaded means operable to extend through diametral holes in the cooperating end areas of a respective one of the two tubular members and the corresponding end portion of the bow-shaped member.

7. A support structure according to claim 6, wherein the threaded means includes a screw or bolt cooperating with a nut.

8. A support structure according to claim 6, wherein said first means includes a relatively short tubular section connected to the center area of the bow-shaped member and of slightly larger diameter than the third tubular member so as to guidingly receive the latter.

9. A support structure according to claim 8, further comprising threaded means for securing the third tubular member assembled in said tubular section.

10. A support structure according to claim 9, wherein said last-mentioned threaded means includes a bolt or screw operable to extend through diametral holes in said tubular section and in said third tubular member when properly assembled, and cooperating with a nut.

11. A support structure according to claim 1, wherein the assembly consisting of the two tubular members, of the bow-shaped member and of the third tubular member is capable to carry the entire weight of filled flower boxes transmitted to the two tubular members by way of said support members.

12. A support structure according to claim 11, wherein each support member includes a hook-shaped bent-up end, by means of which it is inserted into a hole in a corresponding one of the two tubular members, said hook-shaped end being adjoined by a rectilinear support section terminating in a U-shaped bent-up outer end section which in turn is adjoined by a short section substantially parallel to said support section which is followed by a substantially straight obliquely downwardly extending section terminating in a bent end section, by means of which the support member is anchored in diametral holes provided in the same tubular member below the first-mentioned hole.

13. A support structure according to claim 1, wherein the ends of the bow-shaped member and the upper ends of the two tubular members are of mutually complementary shape to enable a telescoping assembly.

14. A support structure according to claim 13, wherein the free ends of either the upper ends of the two tubular members or of the bow-shaped member are of reduced diametric dimension to permit the telescoping assembly.

15. A support structure according to claim 14, further comprising threaded means operable to extend through diametral holes in the cooperating end areas of a respective one of the two tubular members and the corresponding end portion of the bow-shaped member.

16. A support structure according to claim 1, wherein said first means includes a relatively short tubular section connected to the center area of the bow-shaped member and of slightly larger diameter than the third tubular member so as to guidingly receive the latter.

17. A support structure according to claim 16, further comprising threaded means for securing the third tubular member assembled in said tubular section.

18. A support structure according to claim 1, wherein each support member includes a hook-shaped bent-up end, by means of which it is inserted into a hole in a corresponding one of the two tubular members, said hook-shaped end being adjoined by a rectilinear support section terminating in a U-shaped bent-up outer end section which in turn is adjoined by a short section substantially parallel to said support section which is followed by a substantially straight obliquely downwardly extending section terminating in a bent end section, by means of which the support member is anchored in diametral holes provided in the same tubular member below the first-mentioned hole.

* * * * *